United States Patent [19]

Mohrman

[11] 4,392,005

[45] Jul. 5, 1983

[54] TEMPERATURE SENSOR

[75] Inventor: Raymond F. Mohrman, St. Louis, Mo.

[73] Assignee: Mon-a-therm, Inc., St. Louis, Mo.

[21] Appl. No.: 317,128

[22] Filed: Nov. 2, 1981

[51] Int. Cl.³ .............................................. H01L 35/06
[52] U.S. Cl. ..................................... 136/235; 128/736; 136/221
[58] Field of Search ................. 128/736; 136/221, 229, 136/235; 374/163, 165

[56] References Cited

U.S. PATENT DOCUMENTS

| | | | |
|---|---|---|---|
| 3,416,973 | 12/1968 | Benzinger | 136/235 |
| 3,507,153 | 4/1970 | Jones et al. | 136/221 |
| 3,531,992 | 10/1970 | Moore | 136/221 |
| 3,576,516 | 4/1971 | Mull | 229/91 |
| 4,121,642 | 10/1978 | Mohrman | 374/163 |

Primary Examiner—Leland A. Sebastian
Attorney, Agent, or Firm—Senniger, Powers, Leavitt and Roedel

[57] ABSTRACT

A temperature sensor comprising a pair of insulated dissimilar metallic conductors joined at one of their ends to form a thermojunction, and a connector comprising an elongate backing strip of dielectric sheet material. The other ends of the conductors are positioned to extend generally transversely across one face of the strip and are spaced apart longitudinally of the strip. A facing strip of dielectric material on the backing strip overlies the ends of the conductors and has openings therein exposing bare uninsulated portions of the ends of the conductors to provide electrical contacts whereby on insertion of the connector into a mating connector the contacts are engaged by corresponding contacts in the mating connector for making respective electrical connections.

21 Claims, 7 Drawing Figures

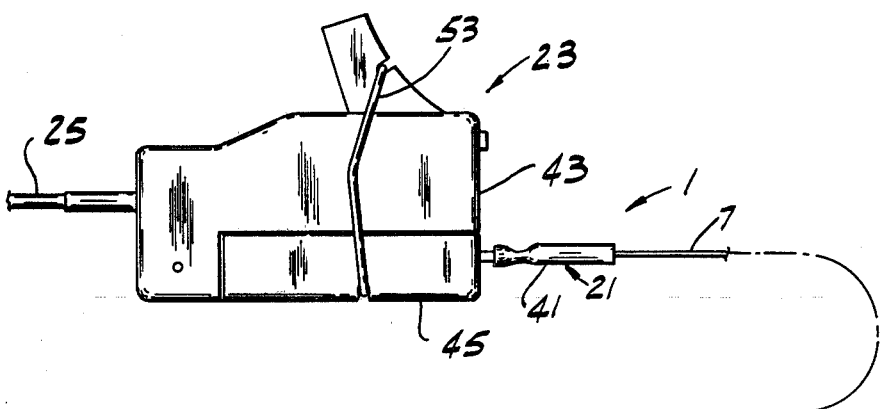
FIG. 1
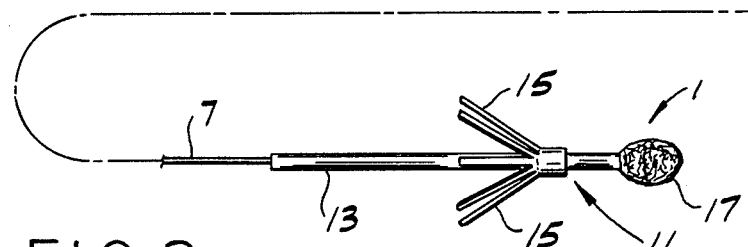
FIG. 3
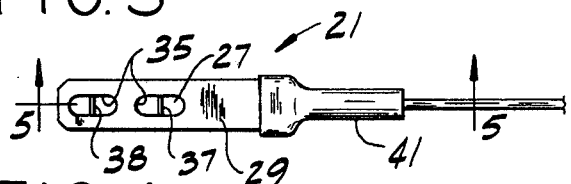
FIG. 4
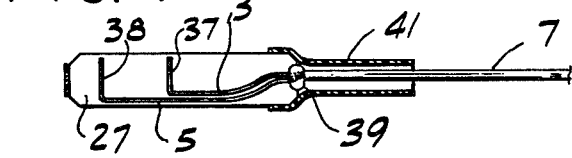
FIG. 5
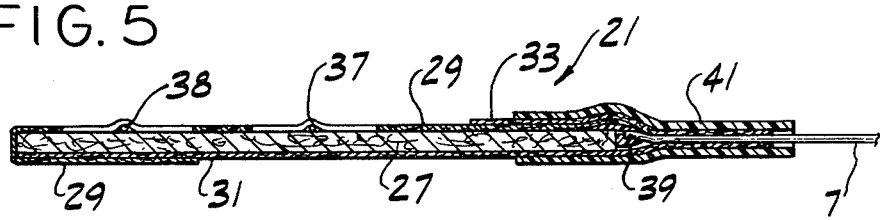

TEMPERATURE SENSOR

BACKGROUND OF THE INVENTION

The present invention relates generally to temperature sensing devices and more particularly to those utilizing thermojunction sensing elements.

Sensors of the thermojunction type are frequently employed in a clinical environment to monitor body temperature, and it is preferable for reasons of health, sanitation and hygiene that the sensor be disposable after each use. This necessitates the use of some sort of electrical connectors to interconnect the sensor and an instrument responsive to the voltage developed by the thermojunction to provide a temperature readout. To facilitate this interconnection quick-disconnect connectors having, for example, male and female connector components, is typically used. The male connector is usually associated with the sensing element and the female component with the instrument.

In one prior art system utilizing such a quick-disconnect type connection, the sensor comprises two separately plastic-jacketed copper and constantan wires joined at one of their ends to form a thermojunction. The other ends of the wires are encased in a plastic tubular sheath which is flattened and fused to serve as the male connector of the connection. Bared terminal portions of the wires exit opposite ends of the flattened sheath and are wrapped around the sheath to provide contacts. The system utilizes a female connector component which has a pair of hinged spring-loaded jaws of insulating material carrying copper and constantan contacts which are respectively engageable with the bare copper and constantan wire contacts of the male connector component when the jaws are snapped closed. This arrangement, while generally satisfactory, has had several drawbacks, one being that it is difficult to control the thickness of the flattened plastic tubular sheath. As a result, the sheath at times may be either too thin, which prevents a good electrical connection between the contacts of the male and female connectors, or too thick, which may overstess the jaw spring if the jaws are forced shut.

Reference may also be made to U.S. Pat. Nos. 3,576,516 and 3,416,973 showing temperature sensing devices utilizing thermojunction sensing elements and quick-disconnect type connectors.

Another problem which has arisen in connection with temperature sensors of the type utilizing a thermojunction sensing element is due to the fact that the two conductors used in the element are very small in diameter (typically copper and constantan wires of #36-40 ga.) and thus prone to breakage. This is particularly true of copper wire which has a relatively low tensile strength. In certain prior art systems, the conductors have been separately jacketed in plastic and then twisted to form a two-conductor cable. If this is subjected to a tensile stress only slightly greater than the ultimate tensile strength of the copper wire, the copper wire may break, even though the constantan has a somewhat higher tensile strength, because in the twisted pair cable arrangement there is no way of insuring that the stress will be shared or that the somewhat weaker copper conductor will not have to carry a disproportionate portion of the stress.

SUMMARY OF THE INVENTION

Among the several objects of this invention may be noted the provision of an improved temperature sensor of the type utilizing a thermojunction sensing element; the provision of such a sensor which is disposable and adapted for quick connection and disconnection to the input terminals of a temperature monitoring instrument; the provision of such a sensor which minimizes breakage of the thermojunction conductors and insures reliable and consistent electrical connections; and the provision of such a sensor which is accurate and reliable in use and inexpensive.

Generally, a temperature sensor of the present invention comprises a pair of dissimilar metallic conductors electrically insulated one from the other along the lengths thereof but electrically connected at one of their ends to form a thermojunction, and a connector comprising an elongate backing strip of dielectric sheet material, the other ends of the conductors being positioned to extend generally transversely across one face of the strip and being spaced apart longitudinally of the strip. Facing strip means comprising a first facing strip of dielectric material on said one face of the backing strip overlies the other ends of the conductors and has openings therein exposing bare uninsulated portions of the other ends of the conductors to provide electrical contacts whereby on insertion of the connector into a mating connector the contacts are adapted to be engaged by corresponding contacts in the mating connector for making respective electrical connections.

Other objects and features will be in part apparent and in part pointed out hereinafter.

BRIEF DESCRIPTION OF THE DRAWINGS

FIG. 1 is an elevation of a temperature sensor of the present invention connected to the input terminals of a temperature measuring instrument, parts of the sensor being broken away for purposes of illustration;

FIG. 3 is a plan of the connector of the temperature sensor;

FIG. 4 is a view similar to FIG. 3 with portions broken away;

FIG. 5 is an enlarged section on line 5—5 of FIG. 3; and

Corresponding reference characters indicate corresponding parts throughout the several views of the drawings.

DESCRIPTION OF A PREFERRED EMBODIMENT

Figure 2:
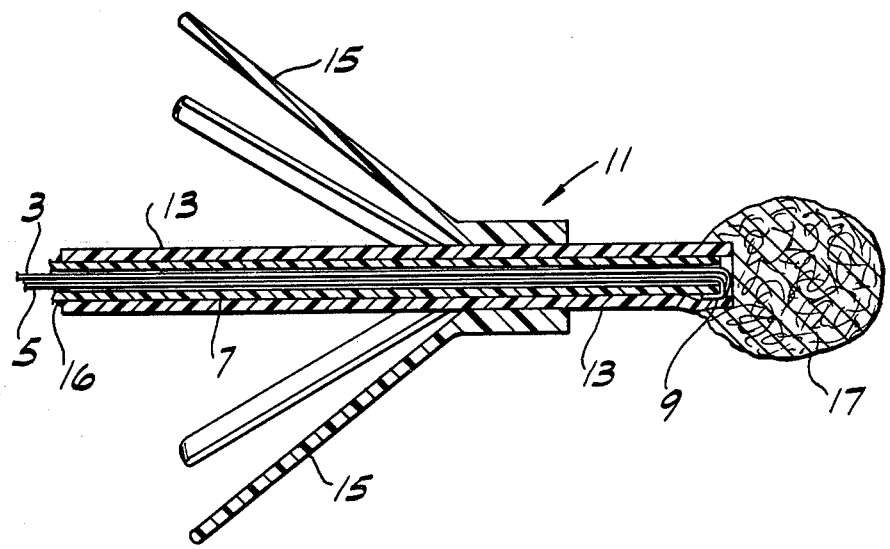
FIG. 2 is an enlarged view of a fragment of FIG. 1 with portions removed to show a thermojunction.

Referring now to the drawings, a temperature sensor of the present invention is indicated in its entirety by the reference numeral 1. As illustrated the sensor is a tympanic sensor adapted to be placed against the tympanic membrane in the ear to measure body core temperatures, but it will be understood that the principles of this invention may be readily applied to other types of sensors as well, including skin temperature sensors, esophageal, Foley catheter and rectal temperature sensors, for example.

The sensor 1 comprises a pair of dissimilar metallic conductors indicated at 3 and 5 sheathed in a single tubular jacket 7 (constituting electrically insulating jacket means) of a suitable synthetic resin material. One conductor 3 may be a bare #36-gage constantan wire, for example, and the other conductor 5 a #36- or 40-gage copper wire having a varnish coating thereon for electrically insulating the conductors from one another. It is preferable that the conductors be sheathed in one jacket rather than separate jackets inasmuch as this ensures that the jacketed lengths (typically about 3 feet) of the conductors are equal and that the copper wire 5 (which has a relatively low tensile strength compared to that of the constantan wire) will not break before the tensile strength of the constantan wire 3 is exceeded. The conductors 3, 5 extend beyond the ends of the tubular jacket 7 and are joined (e.g., soldered or welded) at one of their ends (their right ends as viewed in FIG. 2) to form a thermojunction 9.

In order to maintain the thermojunction closely adjacent the tympanic membrane to ensure that an accurate temperature reading is obtained, a retainer generally designated 11 is fastened to the jacket 7 adjacent the thermojunction 9. As shown best in FIG. 2, this retainer comprises a sleeve 13 fitted around the jacket 7 and a plurality of flexible bristles 15 slidable with respect to sleeve 13 and projecting in conical fashion away from the sleeve, the arrangement being such that upon insertion of the device into the auditory canal, the bristles are engageable with the ear for holding the sensor 1 in proper position with respect to the tympanic membrane. To ensure that the thermojunction 9 remains fixed with respect to the jacket 7 (and does not slip inside the jacket), the terminal portions of the conductors are bent back on the outside of the jacket in the annular space between the jacket 7 and the retainer sleeve 13. The sleeve is affixed to the jacket by means of a suitable adhesive 16 such as is commercially available under the trade designation "Superbonder 495" available from the Loctite Company. A small cotton ball 17 is secured (e.g., glued) to the end of the retainer sleeve, which extends slightly beyond the end of jacket 7, for guarding against injury to the tympanic membrane upon insertion of the sensor into the auditory canal.

A male connector, generally designated 21, is provided at the opposite end of the sensor 1. It is designed for insertion into a mating female connector, generally designated 23, at the end of an input line 25 which leads to a voltage measuring instrument with a temperature readout (not shown). Male connector 21 comprises a relatively thin backing strip 27 of a yieldable dielectric sheet material such as 0.03 in. (0.076 cm.) thick paperboard. The conductors 3, 5 extend from the end of the jacket side by side generally longitudinally of this strip adjacent one side of the strip from the inner end of the strip 9 (its right end as viewed in FIG. 4) toward its outer (left) end. At about the longitudinal midpoint of the backing strip the outer end of the constantan conductor 3 is bent to extend generally transversely across the the upper face of the paperboard strip 27, the wire end terminating at a point generally flush with the opposite side edge of the strip. The copper wire 5 continues outwardly along the strip to a point relatively closely adjacent the outer end of the strip where it too is bent to extend transversely across the strip to a point generally flush with the opposite side edge of the strip. Thus the terminal portions of the conductors 3, 5 extend generally parallel to one another and are spaced apart longitudinally of the strip a predetermined distance (e.g., 0.33 in. or 0.84 cm.). The varnish coating is removed from the terminal portion of the copper conductor extending transversely across the strip 27.

The backing strip 27 is covered by facing strip means comprising three facing strips 29, 31, 33 of dielectric material, each strip being constituted by a strip of pressure-sensitive adhesive tape such as that available commercially from Lamart Corporation of Clifton, N.J. Each of these strips 29, 31, 33 has a width identical to that of the backing strip 27. The first facing strip 29 is adhered to the upper face of the backing strip 27 and overlies the conductors 3, 5 thereby to secure them in fixed position with respect to the backing strip. As indicated at 35, the facing strip 29 has a pair of openings therein exposing bare uninsulated portions 37, 38 of the ends of the conductors 3, 5 to provide electrical contacts for the male connector 21. The strip 29 is folded around the outer end of backing strip 27 and overlaps the second facing strip 31 adhered to the opposite (bottom) face of the backing strip. The third facing strip 33 is adhered to the inner edge margins of the first facing strip 29 and extends in face-to-face relation with the second strip 31 inwardly beyond the inner end of the backing strip. The opposing adhesive faces of these two strips 31, 33 are adhered to one another and to the jacket 7, the end of which is disposed immediately adjacent the inner end of the backing strip.

To provide strain relief for the terminal or contact portions 37, 38 of the conductors 3, 5 on the backing strip 27, the jacket 7 and conductors exiting therefrom are secured by means of a suitable adhesive 39 to the backing strip 27 and to the facing strips 29 and 33 at a point adjacent the inner edge of the backing strip. The adhesive used may be a general purpose instant adhesive such as that used to affix the jacket 7 to the sleeve 13 as disclosed previously.

A tubular sheath 41 is fitted around the inner end of the male connector 21 (i.e., around the inner end of the backing strip 27, the end of the jacket 7 adjacent the backing strip, and portions of the facing strips 29, 31, 33) to present a pleasing appearance and to guard against excessive bending of the conductors 3, 5 at the point where they exit the jacket 7. The sheath 41, which is of heat shrinkable material shrunk for a snug fit around the inner end of the backing strip 27 and for a somewhat looser fit around the jacket 7, also provides some additional strain relief for the contacts 37 on the backing strip 27.

Figure 6:
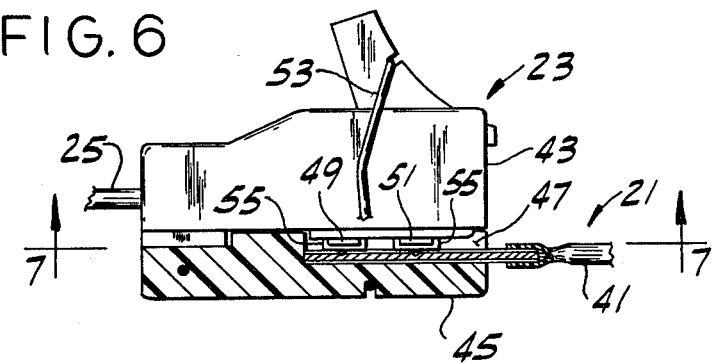
FIG. 6 is an enlarged view of a fragment of FIG. 1 with portions broken away better to illustrate mating male and female connectors of the connection.
Figure 7:
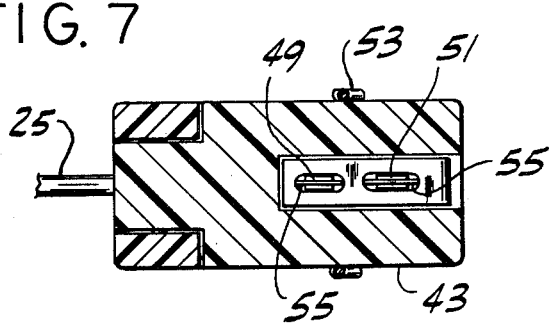
FIG. 7 is an enlarged horiontal section on line 7—7 of FIG. 6 showing the contacts of the female connector.

The female connector 23 comprises a pair of hinged upper and lower jaws of insulating material designated 43 and 45, respectively. The lower jaw 45 is formed with an elongate recess 47 therein dimensioned to receive the male connector 21 of the sensor 1 with the contacts 37, 38 facing upwardly and being exposed through the openings 35 in the facing strip 29. The upper jaw 43 has a pair of contacts thereon, one being a bare copper contact designated 49 and the other a bare constantan contact designated 51. Each contact 49, 51 is positioned on the upper jaw for engaging a corresponding contact 37, 38 of the male connector when the latter is placed in the recess 47 in the lower jaw and the jaws are closed (FIG. 6). The jaws are held shut by a square wire bail 53 encircling the jaws. The female connector contacts 49, 51 have blade portions 55 (see FIG. 7) extending longitudinally with respect to the recess 47 and thus generally at right angles to the wire contacts 37, 38 on the male connector 21. When the jaws of the female connector are closed, these blade portions 55 are designed to wipe against the male contacts and thereby remove any oxide which may have formed thereon to provide a good electrical connection between the contacts. The fact that the backing strip 27 is of a yieldable material (e.g., paperboard prevents the blade portions 55 of the female contacts from completely severing the male contacts. A good electrical connection between the contacts is also ensured from one sensor to the next inasmuch as the construction of the male connector 21 is such that its thickness may be closely controlled, thus avoiding the problem which arises when the connector is either too thin, which prevents a good connection between the contacts, or too thick, which may result after repeated use in overstressing or "springing" of the wire bail 53 if the jaws of the female connector 23 are forcibly closed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature sensor comprising a pair of dissimilar metallic conductors electrically insulated one from the other along the lengths thereof but electrically connected at one of their ends to form a thermojunction, and a connector comprising an elongate backing strip of dielectric sheet material, the other ends of the conductors being positioned to extend generally transversely across one face of the strip and being spaced apart longitudinally of the strip, and facing strip means on the backing strip comprising a first facing strip of dielectric material on said one face of the backing strip overlying said other ends of the conductors, said first facing strip having openings therein exposing bare uninsulated portions of said other ends of the conductors to provide electrical contacts whereby on insertion of said connector into a mating connector said contacts are adapted to be engaged by corresponding contacts in the mating connector for making respective electrical connections.

2. A temperature sensor as set forth in claim 1 wherein said backing strip is of a yieldable material.

3. A temperature sensor as set forth in claim 2 wherein said backing strip is of paperboard.

4. A temperature sensor as set forth in claim 1 wherein said conductors extend side by side generally longitudinally of the backing strip from one end of the strip, constituting its inner end, toward the other end of the strip, constituting its outer end, said other ends of the conductors being bent to extend generally transversely of the strip.

5. A temperature sensor as set forth in claim 4 further comprising means securing the conductors at a point adjacent the inner end of the backing strip to one or both of the backing strip and said facing strip means to provide strain relief for said other ends of the conductors.

6. A temperature sensor as set forth in claim 5 further comprising tubular electrically insulating jacket means sheathing said conductors, said conductors extending beyond the ends of the jacket means.

7. A temperature sensor as set forth in claim 6 wherein said jacket means comprises a single tubular jacket encompassing both conductors.

8. A temperature sensor as set forth in claim 7 further comprising means for electrically insulating the conductors from one another in said jacket.

9. A temperature sensor as set forth in claim 8 wherein said insulating means comprises a varnish coating on one of the conductors.

10. A temperature sensor as set forth in claim 9 wherein one of the conductors is a varnished copper wire and the other is a bare constantan wire.

11. A temperature sensor as set forth in claim 6 wherein one end of said jacket means is disposed immediately adjacent the inner end of the backing strip, and said means providing strain relief comprises an adhesive securing said one end of the jacket means and the conductors extending therefrom to one or both of the backing strip and said facing strip means.

12. A temperature sensor as set forth in claim 11 wherein said facing strip means comprises a first strip of adhesive tape adhered to said one face of the backing strip and securing said other ends of the conductors in fixed position with respect to the backing strip.

13. A temperature sensor as set forth in claim 12 further comprising a tubular sheath fitted around said one end of the jacket and the inner end of the backing strip.

14. A temperature sensor as set forth in claim 13 wherein said tubular sheath is of heat-shrinkable material shrunk for a snug fit around the inner end of the backing strip.

15. A temperature sensor as set forth in claim 4 wherein said facing strip means further comprises a second facing strip of dielectric material on the face of the backing strip opposite said one face.

16. A temperature sensor as set forth in claim 15 wherein said second facing strip is an adhesive strip adhered to said opposite face of the backing strip.

17. A temperature sensor as set forth in claim 16 wherein said first facing strip is folded around the outer end of the backing strip and overlaps the outer margins of the second facing strip on the opposite face of the backing strip.

18. A temperature sensor as set forth in claim 16 wherein said conductors are sheathed in a single electrically insulating tubular jacket and extend beyond the ends of the jacket, one end of said jacket being disposed immediately adjacent the inner end of the backing strip.

19. A temperature sensor as set forth in claim 18 wherein said facing strip means comprising a third facing strip constituted by an adhesive strip adhered to the inner edge margins of the first facing strip, said second and third strips extending in face-to-face relation inwardly beyond the inner edge of the backing strip and being adhered to one another and to said jacket.

20. A temperature sensor as set forth in claim 1 wherein said backing strip is of paperboard.

21. A temperature sensor as set forth in claim 1 wherein said first facing strip comprises a strip of adhesive tape adhered to said one face of the backing strip and securing said other ends of the conductors in fixed position with respect to the backing strip.

* * * * *